W. SHIMON.
CUSHION TIRE.
APPLICATION FILED JAN. 13, 1915.
1,159,538.
Patented Nov. 9, 1915.
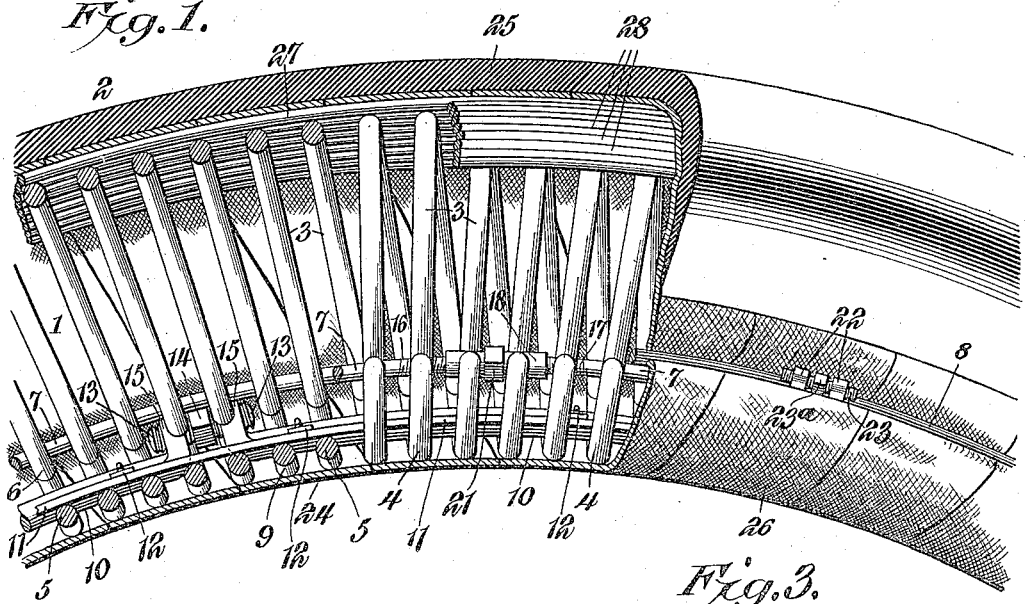
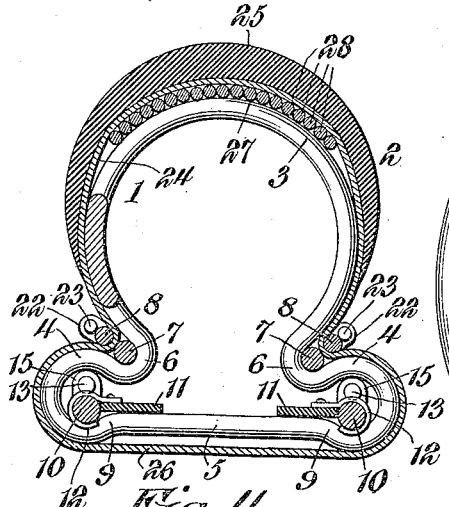
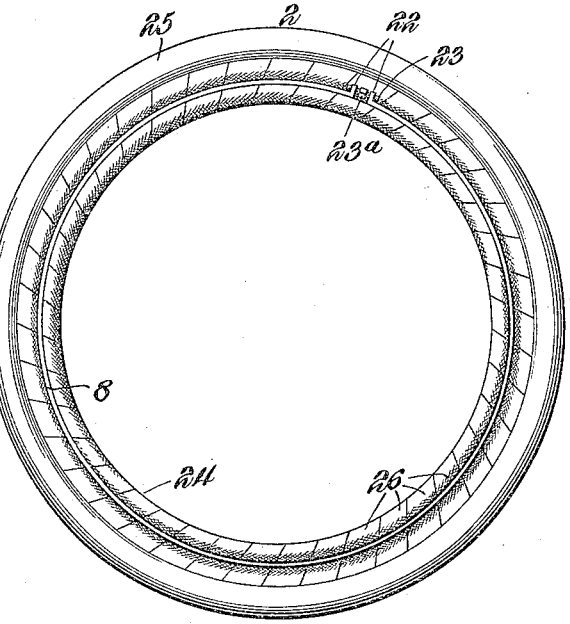
WITNESSES
William Shimon, INVENTOR,
BY
ATTORNEY

UNITED STATES PATENT OFFICE.

WILLIAM SHIMON, OF POCAHONTAS, IOWA.

CUSHION-TIRE.

1,159,538. Specification of Letters Patent. Patented Nov. 9, 1915.

Application filed January 13, 1915. Serial No. 2,048.

*To all whom it may concern:*

Be it known that I, WILLIAM SHIMON, a citizen of the United States, residing at Pocahontas, in the county of Pocahontas and State of Iowa, have invented a new and useful Cushion-Tire, of which the following is a specification.

The invention relates to improvements in cushion tires for automobiles, motor cycles, and various other vehicles.

The object of the present invention is to improve the construction of cushion tires and to provide a simple, practical, and efficient tire, adapted to eliminate blow outs and punctures, and capable of being easily manufactured and affording sufficient resiliency to absorb shocks, jars, and vibrations, and prevent the same from being transmitted to a vehicle, whereby the latter is rendered easy riding.

With these and other objects in view the invention consists in the construction and novel combination of parts hereinafter fully described, illustrated in the accompanying drawing, and pointed out in the claims appended hereto, it being understood that various changes in the form, proportion, size and minor details of construction, within the scope of the claims, may be resorted to without departing from the spirit or sacrificing any of the advantages of the invention.

In the drawing:—Figure 1 is a side elevation, partly in section, of a cushion tire constructed in accordance with this invention. Fig. 2 is a transverse sectional view of the same. Fig. 3 is a side elevation of the complete tire, on a reduced scale. Fig. 4 is a detail sectional view illustrating the manner of adjusting the spring confining rings or bands.

Like numerals of reference designate corresponding parts in all the figures of the drawing.

In the accompanying drawing, in which is illustrated the preferred embodiment of the invention, the cushion tire comprises in its construction a circumferentially arranged cushioning spring 1 housed within an outer shoe or casing 2 and consisting of a single continuous piece of spring wire or other resilient material and composed of spiral coils or convolutions having outer substantially regularly curved approximately circular portions 3 and provided at opposite sides thereof with laterally projecting resilient loops 4, which are connected by transverse base portions 5. The curved outer portions of the coils or convolutions terminate at opposite sides of the inner portion of the spring 1 and are connected with the spring loops 4 by approximately U-shaped bends 6 extending inwardly and forming crotches for the reception of spring confining rings 7 and shoe binding rings 8. The inner or bottom portions of the laterally projecting coils form offsets or shoulders 9 at the ends of the transverse portions 5 for preventing inward movement of spring engaging rings 10. The laterally projecting spring loops 4 are adapted to be arranged between the side flanges of an ordinary rim (not shown) and the cushion tire conforms to the general configuration of a pneumatic tire of the clencher type, and it is adapted to be substituted for the same. The coils or convolutions may be varied in size to provide a tire of the desired diameter and tread area, and the laterally projecting loops may be varied in size and form to adapt them to various forms of rims, and they are adapted to be arranged on a relatively flat rim. These spring loops 4, which are adapted to be compressed in the cushioning action of the tire, contract and expand, and in order to prevent any noise which might result from the contacting of the inner and outer portions of the spring loops when a vehicle is subjected to an excessive load, the tire is provided at opposite sides of the inner or base portion of the coils or convolutions with circumferential cushioning strips 11, designed to be constructed of rubber or other suitable material, and arranged on the transverse connecting portions 5 at the inner sides of the spring engaging rings 10. These strips, which may be secured in place by any suitable means, are preferably connected with the rings 10 by clips 12 or other suitable fastening means.

The spring engaging rings 10, which bind the tire on a rim, are adjustable preferably by means of right and left hand threaded screws 13, provided with a central polygonal wrench receiving portion 14 and engaging right and left hand threaded apertures of ears or lugs 15, preferably formed by the out-turned terminals of the rings 10. The rings 10 clamp the inner or bottom portions of the spring loops tightly against the rim and securely hold the tire thereon. The rings 7 which are adapted to limit the expansion of the laterally projecting spring loops, retain the spring in shape and have right and left hand threaded terminals 16 and 17, which are engaged by a tubular adjusting nut 18 provided with interior right and left hand screw threads 19 and 20. The adjustable nut 18 is also provided with an exterior polygonal portion 21 adapted to receive a wrench or other tool for rotating the nut to adjust the spring confining rings or bands. Any other suitable means may, however, be employed for adjusting the rings 7. Both the curved outer portions of the coils or convolutions and the laterally projecting loops are adapted to cushion the tire, and the tension of the circumferentially arranged spring may be varied by adjusting the confining rings or bands 7.

The rings 8, which are located exteriorly of the outer shoe, are preferably provided with out-turned terminal lugs 22 having right and left hand threaded openings which are engaged by right and left hand threaded portions of an adjusting screw 23 having a central polygonal wrench receiving portion 23ª similar to the spring engaging rings or bands 10. The outer casing or shoe preferably consists of a flexible tube 24 and an elastic tread portion 25 constructed of rubber or rubber and fabric, and vulcanized or otherwise secured to the flexible tube 24. The flexible tube preferably consists of a spirally wound strip 26, which is adapted to be readily separated adjacent to the adjusting device for affording access to the same, but the flexible tube may be constructed in any other desired manner. The tread portion 25 extends transversely around the tire to opposite sides thereof, and tapers at the side portions, as clearly shown in Fig. 2 of the drawing.

The binding rings or bands 8 are adapted to draw the sides of the shoe or casing tightly over the circumferentially arranged spring, and the tire is equipped with a tread supporting member 27, curved transversely and arranged on the outer curved portions of the coils or convolutions and interposed between the same and the flexible tube 24 at the tread portion of the tire. The tread supporting member consists of a transverse series of circumferentially arranged wires 28, which are welded together to form a continuous curved tread supporting member. The circumferentially arranged tread supporting member is adapted to prevent the tread portion of the shoe or outer casing from being cut or injured by the coils or convolutions of the circumferential spring, and they support the said tread portion of the casing or shoe in its engagement with the surface of the road way. The cushioning action of the spring and the tread portion of the shoe is equal to that of a pneumatic tire, and the cushion tire is adapted to absorb shocks, jars, and vibrations and will prevent the same from being transmitted to a vehicle.

What is claimed is:—

1. A cushion tire including a circumferentially arranged spring composed of coils or convolutions having an outer approximately circular portion and provided at the sides thereof with laterally projecting spring loops, and adjustable means mounted on and carried by the spring loops for varying the tension of the said spring.

2. A cushion tire of the class described including a circumferential spring composed of coils or convolutions, each provided with an approximately circular outer portion and provided at the sides thereof with laterally projecting spring loops extending beyond the sides of the said circular portion and forming crotches, and spring confining bands or rings located in the said crotches.

3. A cushion tire of the class described including a circumferential spring composed of coils or convolutions having approximately circular outer portions and laterally projecting spring loops extending beyond the sides of the circular portions and forming crotches, spring confining rings arranged in the crotches and limiting the expansion of the laterally projecting loops, a shoe or casing housing the circumferential spring, and binding rings or bands arranged exteriorly of the shoe or casing at the said crotches and adapted to secure the said shoe or casing tightly around the circular portion of the spring.

4. A cushion tire including a circumferential spring composed of coils or convolutions, each consisting of a substantially circular outer portion, laterally projecting spring loops located at the sides of the circular portion, and an inner transverse portion connecting the spring loops, the latter forming shoulders at the terminals of the transverse portion, and spring engaging rings located within the laterally projecting spring loops and spaced apart by the said shoulders, said rings being adapted to clamp the tire on a rim.

5. A cushion tire including a circumferential spring composed of coils or convolutions provided at their inner portions with laterally projecting spring loops, and cushions consisting of strips extending circumferentially around the spring at the said loops between the spaced sides of the same.

6. A cushion tire including a circumferential spring composed of coils or convolutions provided at their inner portions with laterally projecting spring loops, spring engaging rings located within the laterally projecting loops, and cushions arranged at the inner sides of the rings and connected therewith, said cushions being interposed between the sides of the loops and arranged to be compressed between the same.

In testimony, that I claim the foregoing as my own, I have hereto affixed my signature in the presence of two witnesses.

WILLIAM SHIMON.

Witnesses:
JOHN H. LAMPE,
JOHN S. PASCAL.

Copies of this patent may be obtained for five cents each, by addressing the "Commissioner of Patents, Washington, D. C."